Oct. 8, 1946.                L. GARCEAU                    2,409,033
                      ELECTROENCEPHALOGRAPH DEVICE
                        Filed Nov. 4, 1941           7 Sheets-Sheet 1

INVENTOR.
LOVETT GARCEAU
BY
*Van Deventer + Grier*
ATTORNEYS.

Oct. 8, 1946.    L. GARCEAU    2,409,033
ELECTROENCEPHALOGRAPH DEVICE
Filed Nov. 4, 1941    7 Sheets-Sheet 2

INVENTOR.
LOVETT GARCEAU
BY
Van Deventer + Grier
ATTORNEYS.

Oct. 8, 1946.  L. GARCEAU  2,409,033
ELECTROENCEPHALOGRAPH DEVICE
Filed Nov. 4, 1941  7 Sheets-Sheet 3
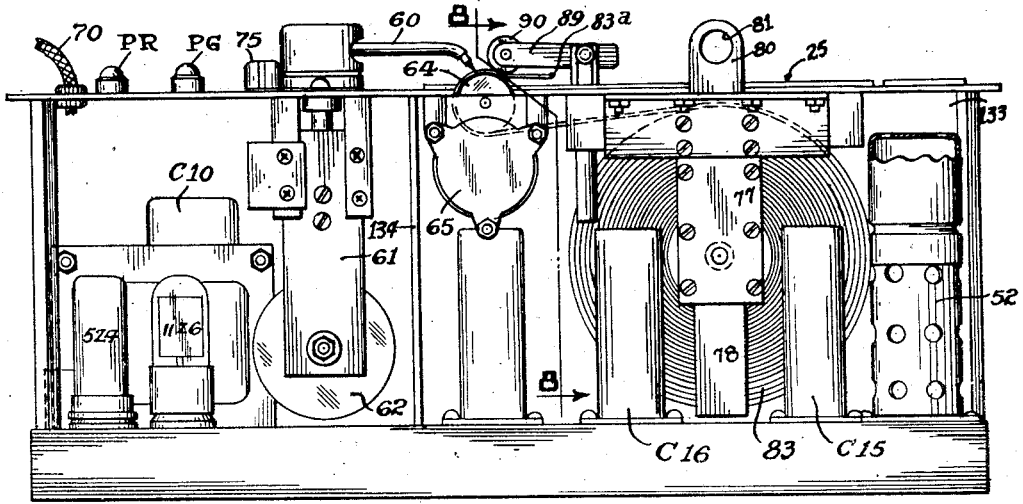
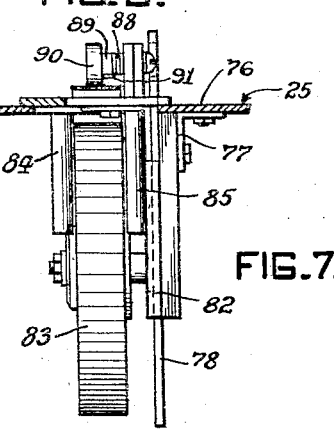
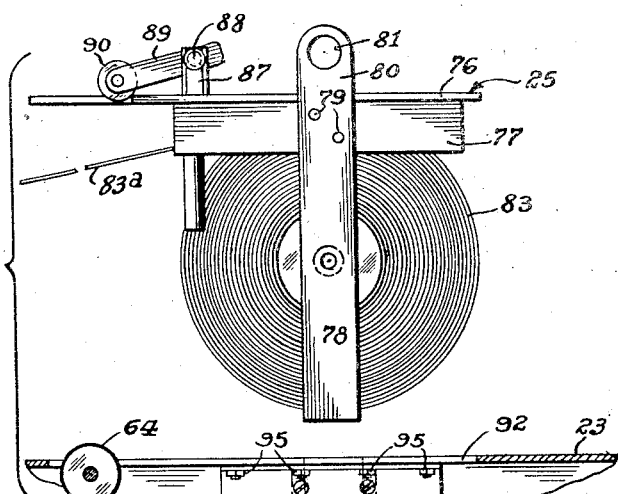
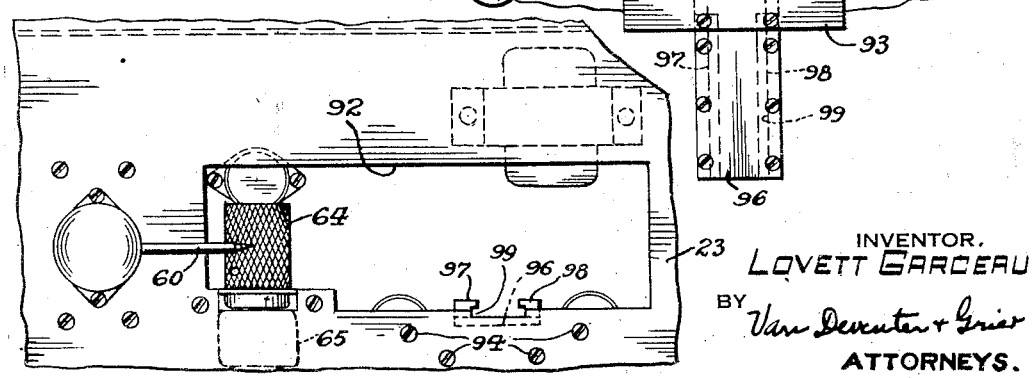
INVENTOR.
LOVETT GARCEAU
BY
Van Deventer + Grier
ATTORNEYS.

Oct. 8, 1946.    L. GARCEAU    2,409,033
ELECTROENCEPHALOGRAPH DEVICE
Filed Nov. 4, 1941    7 Sheets-Sheet 4

INVENTOR.
LOVETT GARCEAU
BY
Van Deventer & Grier
ATTORNEYS.

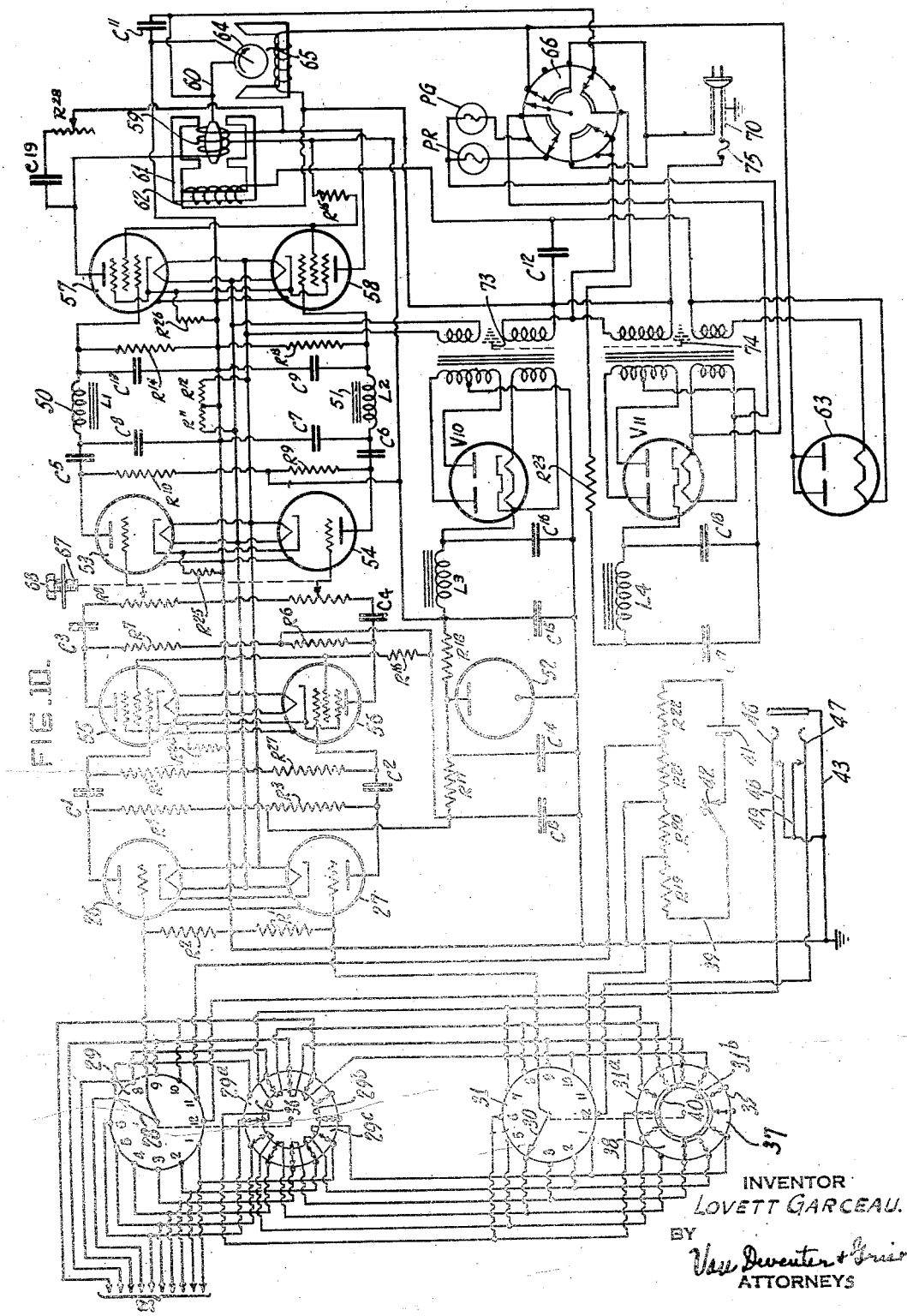

Oct. 8, 1946. L. GARCEAU 2,409,033
ELECTROENCEPHALOGRAPH DEVICE
Filed Nov. 4, 1941 7 Sheets-Sheet 6

INVENTOR.
LOVETT GARCEAU
BY
ATTORNEYS.

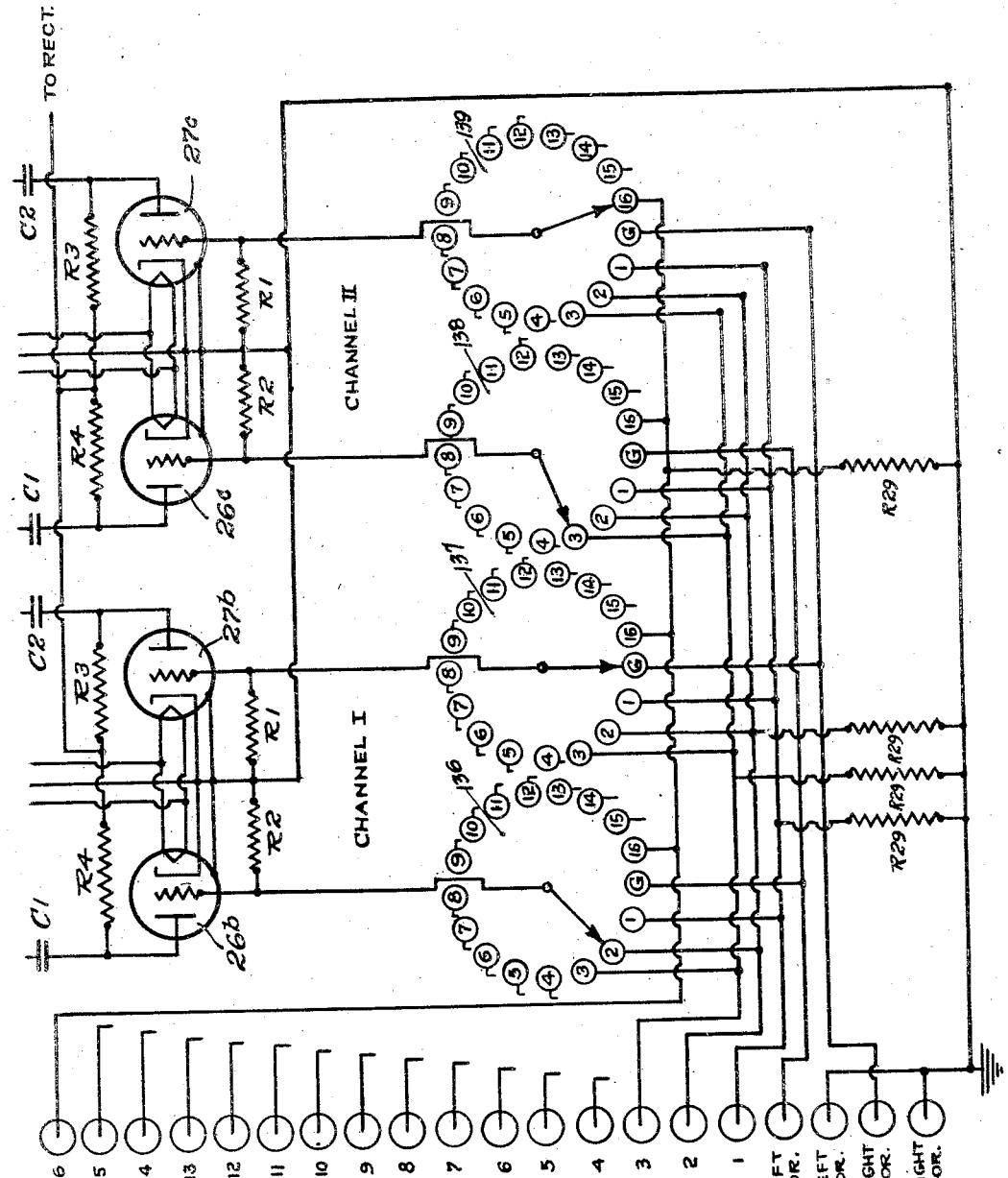

Patented Oct. 8, 1946

2,409,033

UNITED STATES PATENT OFFICE 2,409,033

ELECTROENCEPHALOGRAPH DEVICE

Lovett Garceau, Holliston, Mass.

Application November 4, 1941, Serial No. 417,865

12 Claims. (Cl. 128—2.1)

This invention relates to improvements in electroencephalograph devices and has for an object the provision of a simple and reliable means for recording electroencephalograms and other electrical electrophysiological potentials.

Another object of the invention is the provision of an electroencephalograph device provided with effective shielding, the provision of attachments for connection to said device and to a patient, said connections being provided with shielding devices making it unnecessary for the patient to be placed in a "Faraday cage."

Another object of the invention is the provision in apparatus of the character described of a record feed device for advancing the record at a uniform and definite rate, and the provision of a stylus traversing a station over which the record passes for recording wave forms or other graphs on the record.

A further object of the invention is the provision in a thermionic device of an amplifier including at least two tubes in its input stage, the provision of a multiplicity of electrodes and switching means associated with said electrodes and the input grids of said tubes, said switching devices being arranged so that, for example, two of the electrodes may be selectively associated with said input grids and the remaining electrodes being all connected together and grounded, or separately grounded through individual resistive paths.

Yet another object of the invention is the provision in a thermionic device of a plurality of shielded conductors connected thereto, a plurality of electrodes for contacting human flesh or tissue, a support generally conforming to the shape of a portion of the human head and adapted to support electrodes in contact with human flesh or tissue in a desired selective arrangement, with respect to each other, and connections between said electrodes and said shielded conductors.

A further object of the invention is the provision of a conductor and electrode for contact with the human flesh, the face of said electrode being concave in form for containing a chemical substance for reducing the surface contact resistance between said electrode and said flesh or tissue.

Other objects and advantages of the invention will be apparent to those skilled in the art.

Referring now to the drawings:

Figure 3 is a rear view of the device shown in Figure 2;

Figure 7 is an elevation of the recording tape mechanism removed from the device and showing the portion of the device engaged thereby in elevation;

Figure 8 is an end elevation of the recording tape mechanism as seen along the line 8—8 of Figure 3;

Figure 9 is a plan view of the portion of the device for containing the recording tape mechanism and showing details of the tape drive and the recording mechanism;

Figure 10 is a diagram of the internal circuits of the device;

Figure 15 is a diagram showing the switching arrangement for a plurality of electroencephalograph channels.

Figure 1:
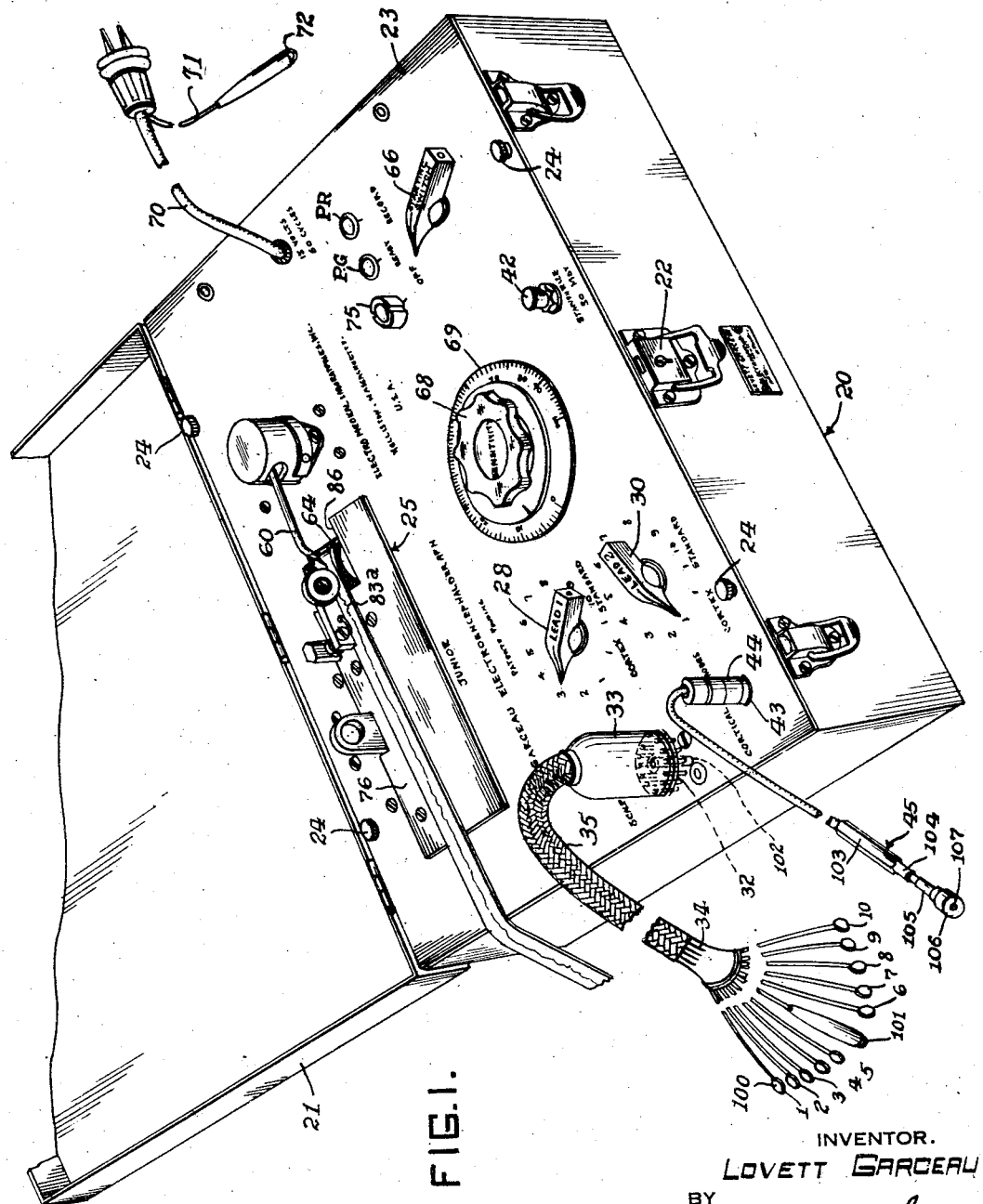
Figure 1 is a perspective view of my new and improved electroencephalograph device with the cover opened and partly broken away.
Figure 2:
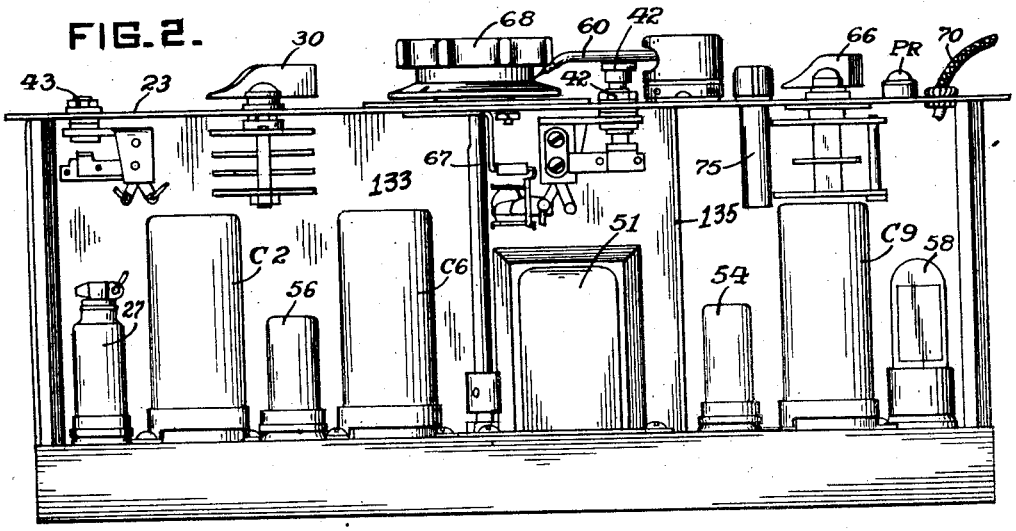
Figure 2 is a front elevation of the device shown in Figure 1, said device having been removed from the cabinet.
Figure 6:
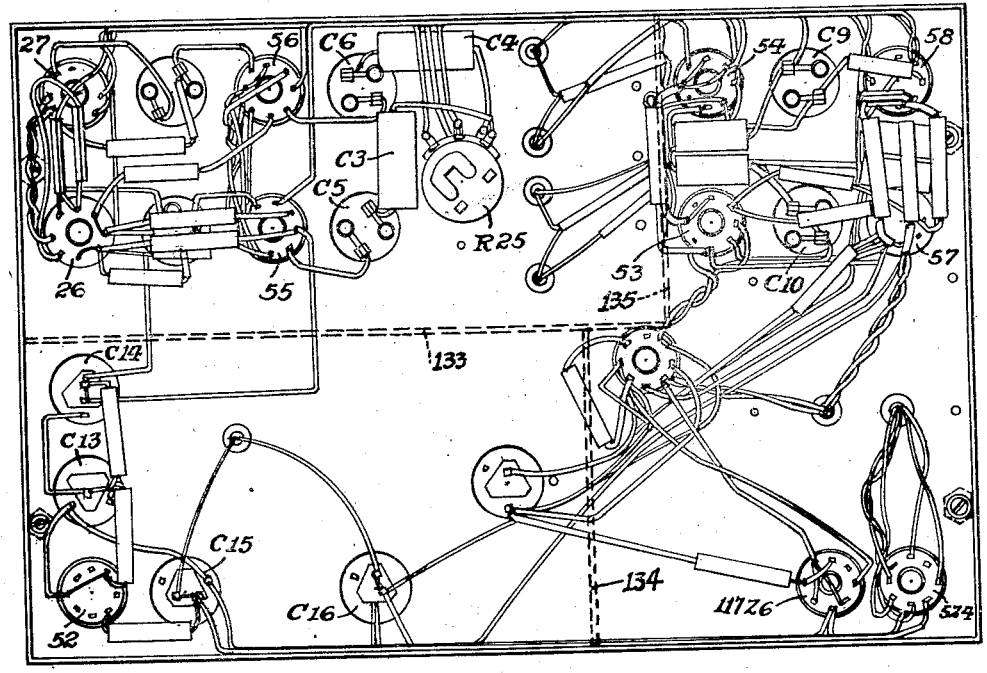
Figure 6 is a view of the device as seen from the bottom thereof.
Figure 5:
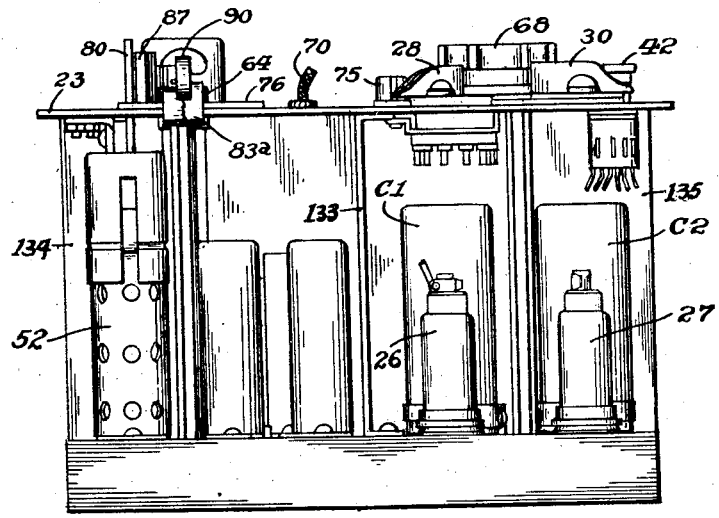
Figures 4 and 5 are, respectively, right and left end views of the device shown in Figures 2 and 3.

By employing an amplifier which includes at least two input tubes (or two control grids in a multiple tube), and by providing a plurality of electrodes and switching means associated with the electrodes and said input grids, I am able to selectively associate any two of the electrodes with said input grids, the remaining electrodes all being connected together and grounded.

In such an arrangement, the special selector switch may have one arm connected to one of the input grids and the other arm to the other input grid. The switches may have ten positions for ten electrodes. The switches connect said grids to any two selected electrodes and simultaneously connect the remaining eight electrodes together and to the ground.

The switch arms when rotated from one position to another short-circuit adjacent contact points while bridging the spaces therebetween. The grids are never "free" and cannot receive large signal voltages which might temporarily paralyze the amplifier.

In order that a clear understanding of the electrical properties of the human body may be had, the following should be borne in mind: If the body were a perfect conductor according to Faraday's laws, all parts of the surface would be of the same potential, and it would, therefore, be impossible for my new and improved electroencephalograph device to detect upon it any differences in potential resulting from action currents.

Were the body a perfect insulator, any potentials developing within it could not be led off and recorded by a device having finite input impedance. As a matter of fact, the body is a poor conductor, therefore potentials developing therein at various points can be led off by surface electrodes to a system having input impedance of comparable or larger magnitude.

Adjacent and more distant portions of the body act as an antenna capacitively coupled to nearby conductors, such as power lines, electrical apparatus, etc., and pick up interfering voltages which are conducted through the body to the lead-off electrodes of the recording system.

In order to drain off to ground a substntial portion of the charges induced by such coupling, the electrodes not connected to the system are grounded either separately through a multiplicity of resistive paths or all directly.

Interference from electro-static fields is further reduced by placing the patient upon a comparatively thin mattress or cushion which rests in turn upon a grounded conducting metal table or a conducting bed-spring. This increases the capacity between the body and earth or ground and therefore reduces the potential induced in the body by any given strength of electro-static field.

As a further step in the reduction of interference, the amplifier operates on a push-pull principle and therefore the potential differences between the grids will be amplified, while the potentials induced by the above-mentioned capacitive coupling affects both grids equally and with the same polarity and will not be amplified.

In this specification, the differences in potential between the grids will be termed "potentials which are out of phase with each other," "potentials which are out phase with one another," or "bio-electric potentials." Potential changes upon both grids in the same direction or polarity will not be amplified, and these potentials will be termed "potentials in phase with each other," "potentials in phase with one another," or "interfering potentials." The means by which this is accomplished will be presently described.

To reduce the interference pick-up as much as possible, contacts established with the surface of the tissue are of a minimum feasible resistance, thereby substantially reducing the impedance across which an interfering field may build up a voltage. With the electrodes used—which electrodes will presently be described—the magnitude of the contact resistance through the skin is of the order of 3,000 to 15,000 ohms. This low contact resistance has the further advantage of permitting the operation of the amplifier without appreciable disturbance by the thermal agitation of electrons in the ohmic resistance comprising the input circuit. The grids, in the input stage of the amplifier, are connected to ground through resistors of the order of 100,000 ohms, thereby in effect further limiting the maximum impedance across which an interfering field may build up a voltage.

A shield is provided between the primary and the secondary windings of the power transformer, and the power cord leading from said primary to a lighting circuit outlet is also shielded.

The grounding system is designed so as to avoid loops in which an interfering electro-magnetic field might build up a large circulating current and across parts of which an interfering voltage might therefore develop. I have found that a ground line made as follows is very effective: A flexible wire ending in a clip and forming a part of the subject's electrode harness is effective, particularly when the clip is connected to the metal of the bed spring or to the metal of the examining table. This flexible wire is also connected to the amplifier case. From its point of arrival inside the case, the wire runs as directly as possible to the cathode of the amplifier tubes in the first stage. All other grounds within the amplifier circuit are made either to this wire or to the case or chassis. The shield of the power-cord may be connected to this wire or to a grounded point within the amplifier case and at the end where the power-cord plug enters the lighting circuit socket the shield is connected to another flexible wire carrying a clip which is connected to a water-pipe ground.

Further means are also employed in my new and improved apparatus to reduce interference; for example, it will be noted that the cathodes of the two triodes in the first stage are connected directly to ground without any bias resistor. These tubes operate with no grid-bias. By directly grounding these cathodes, any potential which might be induced upon them by capacity-coupling through the heater insulators from the heaters, which are operated on raw alternating current, is eliminated. This arrangement also eliminates potentials due to ohmic leakage through imperfections in the heater insulators.

In the subsequent stages of the amplifier, however, the cathodes are biased by means of bias resistors and capacitative and ohmic leakage is therefore balanced as far as possible, for example by the expedient of grounding a mid-point of a resistor of 100 ohms bridging the heaters.

In the plate supply of the first and second stages of the amplifier, I have introduced a voltage regulator tube which is effective in the removal of 60 cycle or 120 cycle ripple from the filters following the rectifiers, and it is also effective in an even more essential capacity in maintaining constant plate voltage for these stages. This is very necessary and important because relatively small plate supply voltage changes would be amplified by the system, and, therefore, would appear as interfering signals in the third and fourth stages, and these interfering signals may be of sufficient amplitude to block the amplifier.

The residual 60 cycle interference from power lines is filtered out by a filter choke introduced between the third and fourth stages. I have found that it is preferable to place the filter in this position in the circuit because here the signal strength is large enough not to be over-ridden by the hum picked up by the inductance elements from the power supply chokes and the power transformer, and also the hum component of the signal at this point is not large enough to run the amplifiers off their linear characteristics and thus modulate the action-current signal.

The reason that a low-pass filter may be used at all is due to the fact that the characteristic frequencies of the electroencephalogram signals lie sufficiently below 60 cycles for a filter to discriminate between said signals and the hum without seriously distorting the wave shape of the signals, (60 cycles being the frequency of the power supply).

Now it is evident that the two active electrodes of the subject or patient will pick up potentials, and that these potentials, if of bioelectric origin, will be different from each other in phase because the electrodes are situated over different groups of cells. Interfering voltages, however, such as those proceeding from commercial frequency electrostatic fields, will tend to affect the entire semi-conducting substance of the body simultaneously, and therefore the interfering voltages as picked up by the electrodes will be in-phase with each other.

In the first stage of the amplifier, which is a simple resistance-capacity coupled circuit, no discrimination or differentiation between either type of potentials or signals referred to hereinbefore is attempted. In the second stage, however, it will be noted that neither the cathode-resistor nor the screen supply resistor are by-passed. As long as the incoming signals from the first stage are equal and opposite (symmetric and out-of-phase with each other) the cathode and screen currents in each tube will change by equal and opposite amounts and there will be no net change in the total cathode and screen currents of the pair.

Assuming, however, that there are also potentials in phase with each other reaching both grids, it will be obvious that this voltage will affect both the screen and the cathode currents in the same direction, and thereby produce a change in the cathode and screen voltage which will tend to degenerate or reduce the last mentioned potentials. This continues on in the third and fourth stages with the result that while the signals which are out of phase with each other are amplified more and more, the signals which are in phase with each other are relatively amplified less and less. The effect is further enhanced by using resistors in the cathode circuits as large as possible, consistent with keeping the operation of the tubes on a linear characteristic. Since no tubes except those in the last stage receive signals large enough to operate them over an appreciable percentage of the total linear plate characteristic, the cathode-resistor and consequently the grid-bias may be made much larger than would be possible were it necessary to obtain full plate swing in all of the stages.

It will be noted that in the circuits of my device I do not employ the obvious subterfuge of using greater cathode-resistors and compensating for the excessive grid-bias produced by the use of a negative voltage supply on its grounded end. Of course the use of such an expedient would be conducive to enormous degeneration effects, but I prefer to use the circuit arrangements herein described.

In the last stage of the amplifier, the push-pull arrangement herein shown is responsive to only those signals which are out of phase with each other, and signals which are in phase with each other have no effect whatever.

It is believed that a better understanding of the action will be had from the following explanation of the action of the unbalanced in-put signals. These signals pass through the first stage of the amplifier with substantially no change in form other than their amplitude. For example, if a positive signal is delivered to one grid only of the first tube in the first stage, and no signal is impressed upon the grid of the second tube in the first stage, an amplified negative signal will result on the first grid of the second stage, and no signal with reference to ground on the second grid of the second stage. Now the negative signal on the second grid in stage two, reduces the cathode current for this tube. The cathodes, being tied together, will simultaneously go negative in voltage.

Since however, grid two of stage two remains at ground potential, this means that cathode two will go negative with respect to its former quiescent potential relative to grid two. Therefore, as far as tube two is concerned, grid two has received the equivalent of a positive signal; therefore, plate-current two will increase and in the output circuit the signal delivered to the next stage will not only show a positive amplified voltage appearing on grid one of stage three, but also a negative and somewhat smaller voltage on grid two of stage three. The process repeats until at the end of the cascade the plate-currents in the two tubes making up the fourth stage show very nearly equal and opposite changes in spite of the fact that the input signal has been applied to one side of the amplifier. The screen circuits of the pentode stages act to enhance this effect.

It will be borne in mind that the selector switches when set for any two given electrodes, at the same time ground the other eight electrodes and the latter are therefore inactive. These eight electrodes are obviously more or less short-circuited together by the action of the switch, but the algebraic sum of their potentials is a definite quantity with respect to the algebraic sum of the potentials of the two active electrodes. The action currents originating beneath these eight inactive electrodes are impressed all in the same phase upon both input grids simultaneously. However, the amplifier degenerates these signals and they do not appear at all in the oscillogram record.

My new and improved electroencephalograph device, referring now to Figure 1, is housed in a metal case 20 which has hinged thereto a cover 21. A suitable lock 22 is provided for securing the cover in its closed position. The top panel 23 is secured in position in the metal case 20 by means of screws 24. Removably mounted in the panel is a record carrying a feeding device generally designated by the numeral 25, which will presently be described in detail particularly in connection with Figures 3, 7, 8, and 9.

The controls and the recording head carried on the panel 23 will be described in connection with the circuit diagram in Figure 10.

The circuit is more or less conventionally shown in Figure 10, and the grids of the input tubes 26, 27, are extended and connected to switching devices; the grid of the tube 26, for example, is connected to the switch-arm 28 of the switch 29, and the grid of the tube 27 is connected to the switch-arm 30.

Leads from the switch 29 are connected to a socket 32 mounted on the panel 23. This socket has contacts corresponding to all ten of the switch positions, and in addition has a ground connection so that when a plug, such as the plug 33, is plugged into said socket, connections are made to all ten of the leads in the cable 34—the shielding 35 on the cable is at the same time connected to ground. This cable, as well as the one shown in Figure 13, will presently be described.

The switch 29 is in effect a two-gang switch, and in one gang the contact arm 28 establishes contact with contact points to which the leads to the socket 32 are connected. These leads are extended to the outside rim 29a of the second gang of the switch, and leads from the contact points of the first gang of the switch 31 are connected to the inside rim 29b of the second gang of the first switch.

The rotor 29 is ganged to the switch arm 28, so that as the rotor 29c moves in unison with the arm 28, points on the switch 31 are connected to corresponding points of the switch 29. Ganged to the switch 31 is a second gang wherein the outer rim 31a is connected to the contact points on the inner rim 29b of the first switch, and wherein the contact points on the inner rim 31b are connected to ground.

It will be noted that on the rotor 29c no bridging contact appears in the position 36 (which in the position shown represents a "7" position of the switch 29). It will also be noted that the rotor 37 of the switch 31 has no bridging contact at the position 38 (which in the position shown represents a "4" position of the switch 31).

With the switches in the positions shown, the grid of the tube 27 is connected to the conductor 4 in the cable, (to be presently described), and the grid of the tube 26 is connected to the conductor 7 in the said cable.

It will also be noted that the inner rim 31b has no ground connection at the point 40; therefore, the "7" switch point on 31 is not grounded, and due to the absence of bridging connection at 38, the "4" position on the switch stage 31a is also not grounded. However, all of the other switch positions on the switch 31 are grounded.

Now, looking at switch 29, it will be seen that the wire connecting the "7" position on the switch 31 to the inner rim 29b is not connected to the position "7" on switch 29 due to the absence of the bridging connection in the position 36. The result is that electrodes connected to leads 7 and 4 (of the cable 34, Figure 1) are directly connected to the input grids of the tubes 26 and 27, and all of the other electrodes are grounded, and I may turn the switches 29 and 31 to other positions to place the grids under the influence of other electrodes at will, all other electrodes than the pair selected being automatically grounded.

Although only ten points have been described on the switches, they actually have twelve positions, as will be seen in Figure 10. When both switch arms are positioned in the "11" position (which is marked "Standard" on the panel 23), the grids of the tubes 26 and 27 are connected to the standardizing circuit 39. This circuit includes a series of resistors $R_{19}$ to $R_{22}$ inclusive, a grid bias cell 41 and a push-button key 42. With the switches in this position, the key 42 may be depressed to record a standard, as will hereinafter be described.

When the switches are turned to the "12" position, which is marked "Cortex" on the panel 23, the grids of the tubes 26 and 27 are connected to a jack 43, so that when a plug 44 is inserted in this jack, said plug being connected to a cortical electrode 45, which will presently be described, the contacts of the cortical electrode are directly connected to said grids.

When the plug is inserted in the jack 43, the contact arms 46, 47, are moved away from each other and away from the contact arms 48, 49, respectively, which are connected together and to ground. In other words, the jack contacts 46 and 47 are normally connected together and to ground until the plug is inserted.

The cathodes of the the two triodes in the input stage, it will be noted, are connected directly to ground without any bias resistor. The filter chokes between the third and fourth stages referred to are designated by the numerals 50 and 51.

In the plate circuit of the first and second stages of the amplifier I have introduced a voltage regulator tube 52 for removing the 60 or 120 cycle ripple from the filters following the rectifier and for maintaining constant plate voltage on these two stages.

For controlling the sensitivity of the instrument, I have introduced a double potentiometer designated as $R_8$. The movable arms thereof are connected to the grids of the tubes 53, 54, in the third stage. The shaft 67 of this double potentiometer carries a knob 68 which operates over a graduated scale 69 on the panel 23 by means of which the sensitivity of the device may be controlled.

The resistance elements of these potentiometers are each grounded at one end, and the other ends are capacitatively coupled to the plates of the tubes 55, 56, in the second stage by means of condensers $C_3$, $C_4$, respectively.

The tubes 57, 58, in the fourth or last stage have their outputs connected to the moving coil 59 which drives the stylus 60. The field structure 61 of the stylus drive is excited by the winding 62 which receives its current from the rectifier 63.

The stylus traverses the recording tape laterally on a rotating drum 64 which is driven by a synchronous motor 65 with suitable gear reduction therebetween. A switch 66 has three positions: (1) an "off" position; (2) a "ready" position; and (3) a "recording" position.

When the switch 66 is in the "ready" position, the heaters in all the tubes are supplied with current, but the exciting coil 62 is not energized, nor is the synchronous motor 65 energized. When the switch is in this position, the pilot light PG, which is green, lights up.

When the switch 66 is moved to the "record" position, the circuits are energized, including the exciting coil 62 and the synchronous motor 65; the pilot light PR, which is red, also lights up, and the pilot light PG is extinguished.

The power cord 70 is shielded and a wire 71 carrying a spring clip 72 is secured to the shield for connecting to a water pipe or radiator. The electrostatic shields 73, 74, are provided between the primaries and secondaries of the power transformers.

The following is a list of the values of the components indicated on the circuit diagram:

| | | | | | |
|---|---|---|---|---|---|
| $R_1$ | ohms | 100,000 | $R_{24}$ | ohms | 2,000 |
| $R_2$ | do | 100,000 | $R_{25}$ | do | 6,000 |
| $R_3$ | megohm | ½ | $R_{26}$ | do | 200 |
| $R_4$ | do | ½ | $R_{27}$ | megohm | ½ |
| $R_5$ | do | ½ | $R_{28}$ | ohms | 25,000 |
| $R_6$ | do | ½ | $C_1$ | microfarad | 1 |
| $R_7$ | do | ½ | $C_2$ | do | 1 |
| $R_8$, dual potentiometer | do | ½–½ | $C_3$ | do | 1 |
| | | | $C_4$ | do | 1 |
| | | | $C_5$ | do | 1 |
| $R_9$ | do | ½ | $C_6$ | do | 1 |
| $R_{10}$ | do | ½ | $C_7$ | do | .02 |
| $R_{11}$ | ohms | 50 | $C_8$ | do | .02 |
| $R_{12}$ | do | 50 | $C_9$ | do | .02 |
| $R_{13}$ | megohm | ½ | $C_{10}$ | do | .02 |
| $R_{14}$ | do | ½ | $C_{11}$ | do | .1 |
| $R_{15}$ | ohms | 15,000 | $C_{12}$ | do | 40 |
| $R_{16}$ | do | 750,000 | $C_{13}$ | do | 60 |
| $R_{17}$ | do | 20,000 | $C_{14}$ | do | 60 |
| $R_{18}$ | do | 50,000 | $C_{15}$ | do | 10 |
| $R_{19}$ | megohms | 3 | $C_{16}$ | do | 15 |
| $R_{20}$ | ohms | 150 | $C_{17}$ | do | 10 |
| $R_{21}$ | do | 150 | $C_{18}$ | do | 15 |
| $R_{22}$ | megohms | 3 | $C_{19}$ | do | .5 |
| $R_{23}$ | ohms | 50,000 | | | |

$L_1$—2220 henries; 26 and 27 Type 6F5; 52—VR 150–30

$L_2$—2220 henries; 55 and 56 Type 6SJ7; $V_{10}$—5Z4

$L_3$—15 henries; 53 and 54 Type 6SF5; $V_{11}$—6X5

$L_4$—15 henries; 57 and 58 Type 6F6; 63—5T4.

I do not wish to be bound by these values as they are merely given by way of example, and it must be distinctly understood that many changes made in the values of these components in the circuits may be made without departing from the spirit of the invention.

A fuse 75 is connected in series with one side of the line feeding the primaries of the power transformers. This fuse is mounted in a cup-shaped holder which projects downwardly from the panel 23 like a well, and is covered with a cap which may be unscrewed for replacing blown fuses.

In connection with the recording device 25, the panel 76, preferably formed of insulation, has secured thereto a bracket 77 (see Figures 7 and 8) and a vertical arm 78 is secured to the bracket 77 in any suitable manner, for example by means of the rivets 79. The vertical arm 78 has a portion 80 thereof extending above the surface of the panel 76, and a hole 81 is formed therein to facilitate the removal of the panel and its contents from the machine, as will hereinafter be described.

A spindle 82 projects laterally from the arm 78 and serves as a support for a roll 83 of record tape. Suitable downwardly depending rods 84 and 85 are mounted on the panel 76 and serve to align and guide the tape 83ᵃ toward the rotating drum 64. The panel 76 has a notch 86 formed therein to accommodate the rotating drum 64 which is provided for feeding the tape at a uniform rate past the recording stylus 60.

The rotating drum 64, as hereinbefore pointed out, is driven by a synchronous motor through suitable gearing, and is of such diameter that the speed of the record tape past the stylus is exactly three centimeters per second.

A boss 87 mounted on the panel 76 carries a stud 88 upon which an arm 89 is pivotally mounted. On the end of the pivoted arm 89 is a shaft upon which is mounted a roller 90 which may have a frictionless bearing between itself and said shaft. Spring means 91 urges the arm 89 in a counter-clockwise direction, as viewed in Figure 7.

As may be seen in Figure 3, the free end of the tape extends from the roll 83 underneath and around the rotating drum 64 and across the flat mid-portion of the panel. This may also be seen in Figure 1. The roller 90 acts as a pressure roller for holding the record in engagement with the knurled surface of the rotating drum 64.

Referring now to Figure 9, the panel 23 has a hole 92 formed therein. This hole may also be seen in Figure 7. A bracket 93 is secured to the panel 23 by means of screws 94 having nuts 95 on the bottoms thereof. Mounted on the bracket 93 is a vertical plate 96. Mounted on the vertical plate 96 is an L-shaped member 97 and a second L-shaped member 98; the legs of the L's of these members face each other, thereby forming a slot therebetween, the slot being designated by the numeral 99. The panel 23 is notched to conform to the slot 99 so that the vertical arm 78 may enter and form a working fit in the slot 99.

In threading up the tape, the free end 83ᵃ should project to the right from off the top of the reel, as seen in Figure 7; first holding the free end of the tape on the reel to prevent it from unwinding, place the arm 78 (which may be termed a slide) in the slot 99 between the guides 97, 98, and lower the panel partially. Then draw the free end of the tape underneath the rotating drum 64 and bring it around the drum and underneath the stylus 60, which may be lifted to facilitate the operation. Then carry the free end of the tape to the left, as viewed in Figures 3 and 9, underneath the roller 90 and over the flat surface of the panel 76. Now lower the panel 76 until it comes in contact with the panel 23, taking up the slack of the tape while doing so by drawing it toward the left. When the tape is properly threaded, it will have the appearance shown in Figure 1.

With the cable 34 connected to the machine by inserting the plug 33 in the socket 32, the ten conductors having metallic disc electrodes 100 connected thereto, are by this operation connected to the switches 28 and 30, and the cable carrying the ground clip 101 is connected to ground by means of the side lug 102 on the plug 33. The disc electrodes are numbered 1 to 10, inclusive, corresponding to the switch positions 1 to 10, inclusive.

In attaching these disc electrodes to the scalp, the operation is facilitated if the subject is seated in a chair. For routine exploration, the following scheme may be adopted:

Electrode:
 # 1. Left frontal
 # 2. Right frontal
 # 3. Left parietal
 # 4. Right parietal
 # 5. Left occipital
 # 6. Right occipital
 # 9. Lobe of left ear
 #10. Lobe of right ear Electrodes #7 and #8 are placed in the vicinity of any area from which other neurological signs are suspect.

The electrodes are placed in contact with the scalp and collodion of a fairly heavy consistency is applied to the skin and to the edges of the electrodes with a medicine dropper. The drying of the collodion is greatly accelerated by means of a current of warm air from an ordinary electric hair dryer.

The electrodes may be held firmly in contact with the skin by means of a pencil point or an orange stick held in contact with the concave depressions in the surfaces of the electrodes until the collodion sets. When the electrodes are secured in place, the patient is transferred to an examining table or cot-bed, and a low pillow may be placed under the patient's head. The cot or examining table may have a thin pad mattress and the ground clip 101 should be connected to the examining table or cot. If painted, the paint should be scraped off so that the clean metal to metal contact is established between the ground clip and the metal of the examining table or the springs of the cot.

It is thoroughly advisable, particularly for the beginner, to make an electrical test of the resistance of the electrode contacts, because the apparatus cannot function if there is a broken or poor contact in the path of a current from the brain to the amplifier. The resistance of the electrode contacts is measured between any two electrodes and should average between 3,000 ohms to a maximum of not more than 15,000 ohms. A higher resistance than this limit would have the twofold effect of reducing the sensitivity of the apparatus and of permitting extraneous interference to get into the amplifier and obscure the record.

If a higher resistance is noted between any pair of electrodes, the defective member of the pair may be determined by checking each one separately with another electrode known to have good contact. The electrode with the defective contact is then taken off and carefully re-applied.

Before applying any electrodes to the scalp, a material for reducing the surface contact resistance may be rubbed into the scalp. All stray wires and other apparatus should be removed from the vicinity of the patient and no person should touch the patient or approach within three feet of the patient during a recording.

Make sure that the tape 83ª can run freely over the motor drum 64 and that it comes off to the left straight and smoothly across the Bakelite panel 76; pull it lightly to be certain that all slack underneath the panel is taken up.

Make sure that the stylus 60 is at rest in the center of the paper. If it stays at one side, push it over hard enough so that when it is released it will remain in the middle.

Turn the starting switch 66 to "Ready." The green panel light PG will show that the amplifier is turned on, and that the tubes are warming up. Allow them three minutes to become stabilized before attempting to record.

For a routine examination by a method now coming to be accepted as standard the procedure is to make records of the left frontal, parietal, and occipital areas with respect to an indifferent electrode, and the same for the right side. To obtain these records with the selector switch, set arm 30 on 9 while arm 28 is placed successively on electrodes 1, 3, and 5, then set arm 30 on 10, while arm 28 is placed on electrodes 2, 4, and 6. By this means the indifferent electrode, which is in contact with the lobe of the ear, is on the same side of the head as the active electrodes, with the result that some cross potentials from deeper structures are eliminated in the recording.

The procedure outlined gives records of what are known as resting potentials. Further records should be taken with electrodes 7 and 8, which have been placed in the neighborhood of suspected lesions or other areas of particular interest. Then records are taken between various pairs of electrodes on the scalp, additional ones being applied if necessary, in order sharply to delineate any focus of unusual electrical gravity. For these readings both selector switches are of course used to connect the amplifier to any pair. Never place arm 28 and arm 30 both on the same electrode number.

Set the sensitivity control 68, to begin with, at, say, "70" on its scale 69. Wait an additional few seconds for the amplifier again to become stabilized.

Now turn the starting switch 66 to "Record." The red panel lamp PR will now light and the tape draw-off motor will start feeding the tape 83ª and the stylus 60 will begin to draw a black line on the paper. If the tape begins to feed crookedly, return the switch 66 to "Ready," pull the free end of the tape to straighten, then switch to "Record" again. The stylus 60 will move sidewise, recording the electroencephalogram. The stylus is electrified when the starting switch is on "Record" and will give a slight unpleasant shock if touched.

If the tracing is not wide enough—that is, has not enough amplitude to give a clear recognizable and easily analyzed graph—very slowly increase the sensitivity by turning the knob 68 toward 100 on scale 69. If on the other hand, the stylus vibrates with such a great amplitude that it hits the internal stops at the ends of its limits of travel, reduce slowly the sensitivity to obtain a suitable tracing. Notations on the leads used, experimental conditions, or events of interest can be made directly in pencil on the tape.

To record from other leads, first stop the record by turning the starting switch back to "Ready." Then change the lead switches to the next pair of electrodes selected. Wait a few seconds for stabilization of the amplifier before turning back to "Record."

At the conclusion of the test, remove the electrode tips from the jack and take the electrodes from the head of the subject by softening the collodion with acetone. Clean the electrodes by washing with alcohol or ether to dissolve the collodion and with water to remove any traces of dried electrode paste. Store the electrodes carefully by fastening them again to the card on which they are shipped or by hanging them from a notched board attached to the wall so that the wires will not become tangled.

In different areas and in different subjects, there is a wide variation in the amplitude of the waves found. It is, therefore, necessary, as directed above, to adjust the sensitivity of the recording mechanism to obtain graphs which, on the one hand, must be large enough to analyze and which, on the other hand, must be small enough to be recorded within the limits of width of the tape. It is desirable, however, to know at all times the absolute magnitude of the waves being recorded.

To find this, for any setting of the sensitivity control 68, turn the starting switch 66 to "Ready," then set arm 28 and arm 30 both on "Standard." Wait a few seconds, then turn the starting switch 66 back to "Record." Now depress and release the black button 42 marked "Standardize." The stylus 60 will make a vertical mark upwards when the button is depressed and back again when the button is released. The length of this vertical line upwards is the response of the stylus to a 50 microvolt signal.

It is also essential to note the speed of the tape in order that the frequency of the waves may be computed. In this instrument, the speed is fixed at exactly 3 centimeters per second. Time relations may instantly be found by measuring the tape with a common metric ruler.

Special electrodes are available for taking electrocorticograms from the exposed cortex at operation under sterile conditions, for taking electromyograms from single muscular units, for taking gross electromyograms from the surface of the skin over the skeletal muscles, etc. To use these electrodes, set both arm 28 and arm 30 at positions marked "Cortex" and plug the special electrode plug 44 into the jack marked 43, "Cortical electrodes."

The cortical electrode 65 includes a holder 103, the outer end 104 of which has a socket formed therein so that the electrode 105 per se may be removed or inserted at will, thereby permitting the electrode to be properly removed and sterilized before being placed in contact with the tissue. The end of the electrode includes a grounded or "shield" area 106 surrounding the active or central core 107. The entire electrode cord may also be sterilized.

In Figures 11 to 14, inclusive, another electrode and cable arrangement is shown. A head-set, generally designated by the numeral 108, includes a head band 109 which may be somewhat oval in form and larger than the average head. A plurality of tapped holes 110 is formed in the band 109 enabling the operator to position the scalp electrodes, which will presently be described, in a very large number of combinations of positions. Pivotally secured to the band 109 are curved members 111, 112, which also contain a plurality of tapped holes 110. The means for pivotally securing the members 111, 112, to the band 109 are thumb screws 113 which enable the operator to set the pair of members 111, 112, in any desired position with respect to each other and with respect to the band 109.

Figure 14:
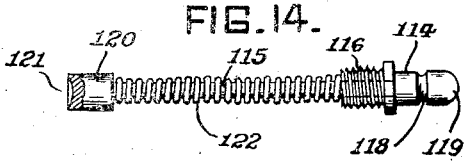
Figure 14 is an enlarged view showing details of one of the electrodes.

The electrodes, one of which is shown enlarged in Figure 14, consist of of a bushing 114 having a hole therethrough which forms a working fit with a shank 115. The bushing also includes an outer threaded surface 116 which fits the threaded holes 110. The shank 115 carries a head which has a groove 118 formed therein and the end 119 is rounded to permit the easy application of a plug thereto, which plug will presently be described.

On the other end of the shank 115 is an electrode 120, the end 121 of which is concave to contain a material for reducing the contact resistance between the electrode and the scalp. A spring 122 extends from the left end of the bushing, as viewed in Figure 14, to the electrode 120 and urges the electrode to the left (which would be toward the scalp when the headset is in position on the patient).

Figure 13:
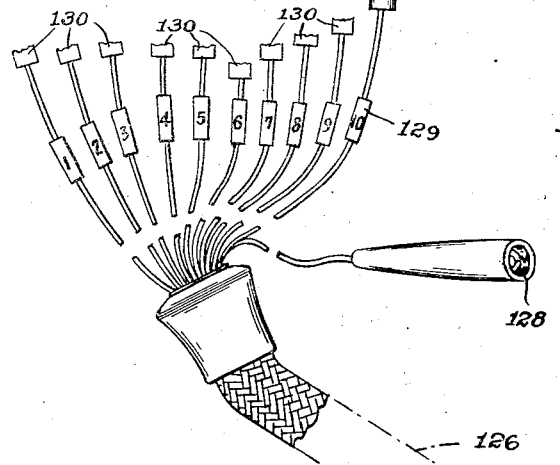
Figure 13 is a view showing a shielded cable carrying a plurality of conductors for attachment to the electrodes shown in the holder in Figures 11 and 12.

Referring now to Figure 13, the plug 123 is like the plug 33 previously described, and includes ten contact pins 124 which fit the socket 32, and a ground lug 125 establishes a ground contact with the chassis. The cable 126 is covered with a shielding 127, and the shielding and the ground clip 128 are connected to the ground lug 125. The ends of the wires of the cable carry tabs 129 which bear numbers corresponding to the positions of the switches 28 and 30. Each conductor has secured to the end thereof a plug 130. This plug has a hole 131 formed therein which forms a socket to receive the head of the electrode, and spring members 132 are provided for reducing the contact resistance between the plug and the head.

The headset may be applied to the subject, and the curved members 111, 112, adjusted to desirable positions and secured by means of the thumb nuts 113, and the electrodes may be applied to any desired combinations of tap holes 110 after which the plugs 130 may be connected to the electrodes and the socket 123 plugged in. The procedure may follow the procedure described above in connection with the cable 34.

The recording mechanism includes four pole pieces and the powerful direct current electromagnet 62 energizes these pole pieces. The moving armature coil is wound in two sections, and both are placed over the armature so that it is magnetized virtually by the algebraic sum of the two currents of the two coils; one coil is placed in the plate circuit of the output tube 57, and the other is placed in the circuit of the output tube 58. The direct current plate components flow through these coils in such a direction that the magnetic fields cancel. The coils are wound to the correct load impedance for the output tubes.

The armature is returned to its central position by a pair of very strong phosphor-bronze helical tension springs, with the result that the recording mechanism has exceedingly high efficiency and develops relatively enormous power.

The condenser $C^{19}$ and resistor $R^{28}$ supply critical damping to the moving element of the recording mechanism.

The armature shaft is vertical, and at the top of this shaft is a steel cross-head (not shown) which carries the stylus 60 by a right-angle extension of the latter which passes through the head horizontally. The stylus is therefore moved through a horizontal arc by the vibrations of the armature, but is held in contact with the record 83a by a helical torsion spring which urges it vertically downwardly.

The stylus is maintained at a positive potential by the transformer 74 and its associated rectifier and filter system, the current passing through the limiting resistor $R23$ to the stylus. The passage of the current produces an immediately visible and permanent record on the prepared electro-chemically sensitive tape 83a. This current is turned on simultaneously with the current to the motor 65 and the current to the field 62 by moving switch 66 to position "Record." Condenser $C^{11}$ serves to eliminate radio interference caused by arcing to the stylus point. This recording system, without electrification of the stylus, is suitable for use with a prepared wax-covered tape.

A shield 133 having an angular portion 135 isolates the first three amplifier stages from the fourth stage, the rectifiers and the recording devices. The shield 134 joins the shield 133 and is positioned between the rectifiers and the recording device.

I have also made electroencephalographs for multi-channel work which employed a plurality of amplifiers (as many amplifiers as channels desired). Figure 15 shows an arrangement for a multi-channel electroencephalograph, portions of the amplifier being omitted to avoid duplication.

In this arrangement the multi-point switches employed have seventeen points and sixteen active positions, the seventeenth point being connected to ground.

The switches in channel I are designated by the numerals 136 and 137, and the switches in channel II are designated by the numerals 138 and 139. The midpoint of the switch 136 is connected to the grid of the input tube 26$^b$, and the midpoint of the switch 137 is connected to the grid of the input tube 27$^b$. The input tubes 26$^b$ and 27$^b$ are exactly like the input tubes 26 and 27 shown in Figure 10, and the balance of the circuit associated with the tubes 26$^b$ and 27$^b$ is exactly like the circuits associated with the tubes 26 and 27 in Figure 10, and therefore they need not be repeated in Figure 15 or further described.

In channel II the midpoint of the switch 138 is connected to the grid of input tube 26$^c$ and the midpoint of the switch 139 is connected to the grid of the input tube 27$^c$, the rest of the amplifier also being like that shown in Figure 10.

Figure 4:
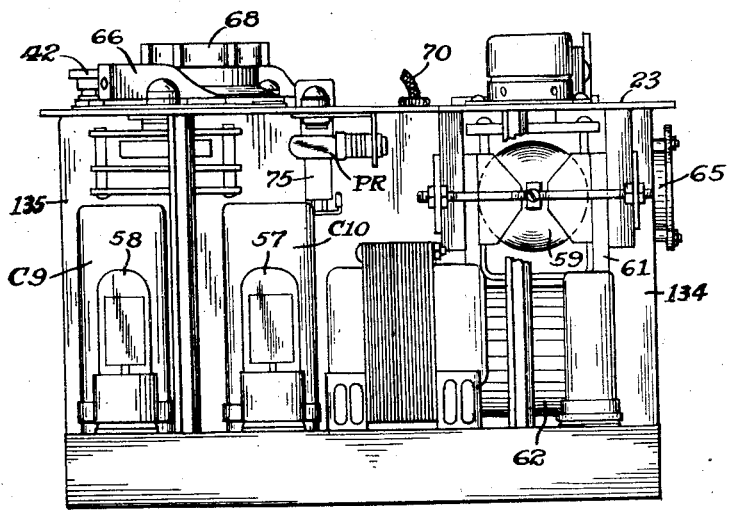
Figure 11:
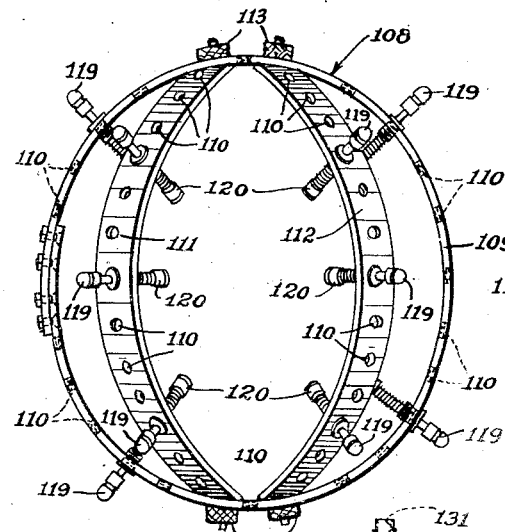
Figure 11 is a plan view of one form of electrode support, the same being adapted to be applied to the head of the patient for supporting the electrodes in a very large number of combinations of positions.
Figure 12:
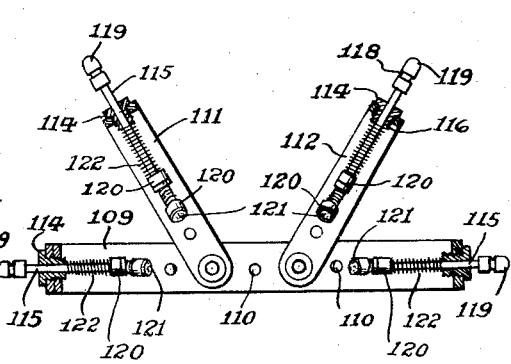
Figure 12 is a transverse sectional elevation of the electrode holder shown in Figure 11.

The stylus controlled by the channel I and the stylus controlled by the channel II are placed side by side in reasonably close spaced relation to each other. The tape used with the two styluses is substantially wider than the tape 83$^a$; also the rotating drum is likewise wider than the rotating drum 64; but the driving arrangement is identical to that shown at 65 in Figures 3 and 4.

In Figure 15 a further modification is shown, which modification may likewise be applied to the single channel electroencephalograph hereinbefore described. Instead of short-circuiting and grounding the switch contacts not in use, and thereby grounding the electrodes to which they are connected, this shorting feature may be omitted and the switch contacts may all be connected to ground through resistors.

In multi-channel devices, I have successfully employed resistors for this purpose each having a resistance of 100,000 ohms. This results in a large number of parallel grounded resistors, and the final effect in interference suppression is found to be substantially the equivalent of the shorting arrangement shown in Figure 10.

Another advantage is that with this arrangement the switches are simpler and therefore less expensive and less liable to get out of order.

In Figure 15, I have shown the leads running from the switches as terminating in individual binding posts, but it is obvious that these could be connected to sockets in the manner shown in Figure 10.

The device herein described may also be used as an electrocardiograph, in fact it is believed to be the only device ever built which will successfully produce an electrocardiogram not requiring photographic development for the preservation of the record. Notwithstanding analyses which indicate the desirability of a frequency range up to at least 240 cycles per second, my device turns out, even with the filters described in the circuit, very creditable records. By cutting out the filters, I obtain a higher frequency range which admittedly is advantageous.

In using the apparatus as an electrocardiograph, it is merely necessary to position the electrodes to pick up heart potentials instead of brain potentials. When the device is used as an electrocardiograph, the grounding of the electrodes is not necessary in view of the fact that the amplitude of the electrocardiogram is so much greater than that of the electroencephalogram that the precautions of hum filtering and grounding of additional electrodes are entirely unnecessary.

In this specification and in the appended claims, the term "bio-electric potentials" are taken to mean potentials which are out-of-phase with each other or which are of opposite phase, as the device deals with potentials which are primarily picked up by not less than two active electrodes on a biological preparation. One end of the group of cells in the biological preparation may be negative with respect to the other end of the same group when a bio-electric potential is being picked up by the electrodes.

The term "potentials in phase with each other," "potentials in phase with one another," or "interfering potentials" used herein is taken to mean any extraneous or interfering potentials, such as static, both man made and natural. It will be appreciated that the bio-electric potentials are very small and that all interfering potentials are very great in comparison thereto.

It will be evident from a study of the above specification that I construct my amplifier so that each stage therein tends to cancel out interfering potenials and at the same time to amplify bio-electric potentials (potentials which are out of phase with one another or with each other) and that as a means of catching and shoving out any interfering potentials which have not been previously balanced out or which are instituted in the amplifier itself, I provide filter chokes between the output of the next to the last stage and the final stage.

Although I have herein shown and described by way of illustration a device for producing electroencephalograms which obviate the necessity for shielding the instrument and/or the patient by means of a "Faraday cage" or the like, said device also being capable of making electrocardiograms, I do not wish to be bound by the exact arrangements and the specific values of elements herein shown and described, as it is obvious that many changes may be made in the apparatus shown without departing from the spirit of the invention as set forth in the annexed claims.

What is claimed is:

1. In a device for making recordings of potentials generated in the human brain, a multi-stage push-pull amplifier, a plurality of contact members, means to hold said contact members in predetermined or definite positions in contact with the scalp of a patient, switching means, conductors for connecting said contact members to said switching means, connections between said switching means and the control grids of the first stage of said amplifier, said switching means being adapted to selectively connect said grids to any two of said conductors and to ground all of the other conductors, shielding means surrounding said conductors and connected to ground potential, a metallic table or the like for supporting said patient, a thin insulating pad between said table and said patient, means for connecting said support to ground potential thereby reducing the impedance of said tissue and leading off interfering potentials to ground, and a recording device connected to the output of said amplifier for recording potentials picked up by said contact members from said patient after the same have been amplified.

2. In an electroencephalograph, a panel, an amplifier beneath said panel, a recording device including a motor-driven drum, a recording tape embracing said drum in driven relation thereto, a stylus carried on said panel in contact with the tape on said drum, said stylus being motivated by the output current of said amplifier; and a control switch on said panel having a first position wherein all circuits are "dead," a second position wherein the heaters of the tubes in said amplifier are supplied with energy, and a third position wherein said amplifier is rendered fully operable and the motor for driving said drum is supplied with energy for moving said tape past said stylus.

3. In an electroencephalograph, in combination, a head-set including a substantially rigid oval band having a plurality of tapped holes formed therein in spaced relation to each other, at least one arcuate member being pivotally supported on said band and also carrying a plurality of spaced tapped holes, a plurality of electrodes adapted to be selectively positioned in any of said tapped holes and each being comprised of a scalp-engaging member, a shank, and a terminal end, said shank carrying a spring and a threaded bushing having threads to match said tapped holes, said spring being so positioned on said shank as to urge its scalp-engaging member into resilient contact with the scalp, and a cable connected to said electroencephalograph and carrying sockets engaging said terminal ends.

4. In an electroencephalograph, in combination, a head-set including a substantially rigid oval band having a plurality of tapped holes formed therein in spaced relation to each other, a plurality of arcuate members pivotally connected to said band and each also carrying a plurality of spaced tapped holes, whereby said arcuate members may be given any desired positions with respect to each other and to said band, means to clamp said arcuate members in any desired positions; a plurality of electrodes adapted to be selectively positioned in any of said tapped holes, and each being comprised of a scalp-engaging member, a shank, and a terminal end, said shank carrying a spring and a threaded bushing having threads to match said tapped holes, said spring being so positioned on said shank as to urge its scalp-engaging member into resilient contact with the scalp; and a cable connected to said electroencephalagraph and carrying sockets engaging said terminal ends.

5. In an electroencephalograph, a multistage push-pull thermionic amplifier including resistors and capacitors interconnecting said stages and non-by-passed resistors included in circuits with the cathodes and screen grids of several of said stages themselves for causing bio-electric as out-of-phase potentials to be amplified and for effecting the nullification or balancing out of in-phase or interference potentials, means for connecting said amplifier to a source of alternating current, filter choke means connected between the output of one of said stages and the input of the next succeeding stage for deleting interference potentials which the previous stages have failed to balance out, together with interfering potentials originating in the amplifier itself and the alternating current hum, a pair of multi-contact switches connected to the input tubes of said amplifier, a plurality of conductors connected to said switches, whereby the inputs of said tubes may be selectively connected to any two of said conductors and bio-electric or out-of-phase potentials carried by any combination of two of said conductors selected by said switches may be delivered to the input of said amplifier.

6. In an electroencephalograph, a multistage push-pull thermionic amplifier including resistors and capacitors interconnecting the tubes of said stages and non by-passed resistors connecting the cathodes in several of said stages directly to ground and other non by-passed resistors in series with the screen grids of said several stages for causing bio-electric or out-of-phase potentials to be amplified and for effecting the nullification or balancing out of in-phase or interference potentials, means for connecting said amplifier to a source of alternating current, filter choke means connected between the output of one of said stages and the input of the next succeeding stage for deleting interference potentials which the previous stages have failed to balance out, together with interfering potentials originating in the amplifier itself and the alternating current hum, recording means connected to the output of said amplifier, a panel, a pair of multi-contact switches on said panel connected to the input tubes of said amplifier, a plurality of shielded conductors connected to the contacts of said switches, means for connecting said cables to sources of bio-electric or out-of-phase potentials, and connections between ground potential and said switches, said last connections being arranged to ground all of the contacts on said switches except one on each switch, whereby a single selected contact on each switch may be ungrounded and connected to one of the input tubes of said amplifier.

7. In an electroencephalograph, a multistage push-pull thermionic amplifier including resistors and capacitors interconnecting the tubes of said stages and non by-passed resistors connecting the cathodes in several of said stages directly to ground and other non by-passed resistors in series with the screen grids of said several stages for causing bio-electric or out-of-phase potentials to be amplified and for effecting the nullification or balancing out of in-phase or interference potentials, means for connecting said amplifier to a source of alternating current, filter choke means connected between the output of one of said stages and the input of the next succeeding stage for deleting interference potentials which the previous stages have failed to balance out, together with interfering potentials originating in the amplifier itself and the alternating current hum, recording means connected to the output of said amplifier, a cortical electrode including a central electrode surrounded by a grounded, shielded area, both being positioned in contact with brain tissue, said central electrode being adapted to be influenced by brain potentials, conductors connected to said cortical electrode and to the input tubes of said amplifier, and a shield about said conductors and connected to ground potential.

8. In an electroencephalograph, a multistage push-pull thermionic amplifier including resistors and capacitors interconnecting the tubes in said stages and non by-passed resistors connecting the cathodes in several of said stages directly to ground and other non by-passed resistors in series with the screen grid circuits of said several stages for causing bio-electric or out-of-phase potentials to be amplified and for effecting the nullification or balancing out of in-phase or interference potentials, said amplifier also including resistors between the input grids of the first stage of said amplifier and ground potential for limiting the impedance across which interfering fields may build up voltages, a filter choke between the input of the last stage and the output of the next preceding stage for deleting interference potentials which the preceding stages have failed to balance out, together with interfering potentials originating in the amplifier itself, recording means connected to the output of said amplifier, a shielded cable having a plurality of conductors positioned on a biological preparation, selective switching means connected to said grids and having contacts connected to said conductors whereby different sources of bio-electric or out-of-phase potentials may be delivered to said grids, and shortcircuiting means included in said switching means for grounding all said contacts except the ones connected to said grids.

9. In an electroencephalograph, a four stage push-pull amplifier including a power pack for amplifying potentials which are out of phase with each other and for nullifying potentials which are in phase with each other and termed interfering potentials, means for connecting said amplifier to a source of alternating current, connections between the control grids of the first of said stages and a source of potentials which are out of phase with each other, means for shielding said connections from interfering fields, resistance bridges from said grids to ground potential for limiting the impedance across which interfering fields may build up voltages, means for maintaining constant plate voltages on said first and the second of said stages, thereby preventing plate voltage changes which would be amplified and appear as interfering signals in the third and fourth stages, at least one of said stages including two anodes, two cathodes, two control grids and two screen grids, said control grids being capacitively coupled to the anodes of said first stage, said cathodes and said screen grids employing non by-passed resistors, filter chokes between said third and said fourth stages for filtering out alternating current hum, and recording means connected to the output of said fourth stage.

10. In an electroencephalograph, a four stage push-pull amplifier for amplifying potentials which are out of phase with each other and termed bio-electric and for nullifying potentials which are in phase with each other and termed interfering potentials, a power pack for said amplifier, means for connecting the same to an alternating current power line, shielded conductors connected to the control grids of the input stage of said amplifier and to a source of bio-electric potentials, terminals on said cables and included in the connections to said source, means for reducing the contact resistance between said terminals and said source, resistance bridges from said control grids to ground potential for defining the maximum impedance across which interfering fields may build up voltages, means for maintaining constant plate voltages on said first and the second of said stages, thereby preventing plate voltage changes which would be amplified and appear as interfering signals in the third and fourth stages, others of said stages each including two anodes, two cathodes, two control grids and two screen grids, said control grids being capacitively coupled to the anodes of said first stage, said cathodes and said screen grids employing non by-passed resistors for diminishing the tendency for changes to occur in the net total cathode and screen currents when said bio-electric potentials are impressed on the control grids of said first stage, the said cathode and screen currents both being affected in the same direction by said interfering potentials impressed across the grids of the input stage, filter chokes between said third and said fourth stages for filtering out alternating current hum, and recording means connected to the output of said fourth stage.

11. In an electroencephalograph, a multi-stage push-pull amplifier, a plurality of contact members, means to hold said contact members in predetermined or definite positions in contact with animal tissue, switching means, conductors for connecting said contact members to said switching means, connection between said switching means and the control grids of the first stage of said amplifier, said switching means being adapted to selectively connect said grids to any of said conductors, shielding means surrounding said conductors and connected to ground potential, the two tubes in said first stage including cathodes which are directly connected to ground potential thereby placing them intermediate the potentials on said control grids, a metallic table or the like for supporting said animal tissue, an insulating pad between said table and said animal tissue, means for connecting said support to ground potential thereby reducing the impedance of said tissue and leading off interfering potentials to ground, said amplifier including at least other stages each employing two anodes, two cathodes, two control grids and two screen grids, said control grids being capacitively coupled to the anodes of the preceeding stage, said cathodes and said screen grids employing non by-passed resistors for minimizing any tendency for changes to occur in the values of the net total cathode and screen currents when potentials which are out of phase with each other and termed bio-electric potentials are impressed on the grids of said first stage, the cathode and screen currents in each stage both being adapted to be affected in the same direction when potentials which are in phase with each other and termed interfering potentials are impressed across the grids of said first stage whereby said first mentioned potentials are amplified and said last mentioned potentials are degenerated or reduced, and a recording device connected to the output of said amplifier for recording potentials picked up by said contact members from said tissue after the same have been amplified.

12. In an electroencephalograph, a multistage push-pull thermionic tube amplifier including resistors and capacitors interconnecting said stages, at least two of said stages including screen grid tubes having their cathodes connected to ground potential through non by-passed resistors and having their screen grids connected through non by-passed resistors to the high potential source in said amplifier for causing potentials respectively opposite to each other in phase impressed on the input of said amplifier to be amplified, and for effecting the nullification or balancing out of potentials which are in phase with one another, said amplifier also including filter choke means between the output of one of said stages and the input of the next succeeding stage for deleting those of said last mentioned potentials which the preceding stages failed to balance out, together with other interfering potentials also in phase with one another and originating in the amplifier itself, recording means connected to the output of said amplifier, and shielded conductors for leading said potentials that are respectively opposite to each other in phase to the input of said amplifier.

LOVETT GARCEAU.